US006182106B1

(12) United States Patent
Casey et al.

(10) Patent No.: US 6,182,106 B1
(45) Date of Patent: Jan. 30, 2001

(54) METHOD AND SYSTEM FOR PROVIDING A COMMON HARDWARE SYSTEM CONSOLE INTERFACE IN DATA PROCESSING SYSTEMS

(75) Inventors: Bernice Ellen Casey, Woodstock; Gregory Lee Dunlap; Margaret Croft Enichen, both of Poughkeepsie; Deborah Anne Totten Larnerd, Binghamton; James Andrew Morrell, Endicott; Stephen Richard Nichols, Freeville; Peter David Pagerey, Saugerties; Sammy Lee Rockwell, Owego, all of NY (US)

(73) Assignee: International Business Machines Corporation, Armonk, NY (US)

( * ) Notice: Under 35 U.S.C. 154(b), the term of this patent shall be extended for 0 days.

(21) Appl. No.: 08/113,789

(22) Filed: Aug. 30, 1993

(51) Int. Cl.⁷ ....................................................... G06F 9/00
(52) U.S. Cl. .............................. 709/100; 717/11; 345/326
(58) Field of Search ............................... 717/11; 709/100, 709/222, 244; 345/326, 352, 966, 969

(56) References Cited

U.S. PATENT DOCUMENTS

| | | | |
|---|---|---|---|
| 4,014,005 | 3/1977 | Fox et al. ........................... | 340/172.5 |
| 4,075,693 | 2/1978 | Fox et al. .............................. | 364/200 |
| 4,414,621 | 11/1983 | Bown et al. ......................... | 364/200 |
| 4,443,861 | * 4/1984 | Slater ................................... | 364/900 |
| 4,530,051 | * 7/1985 | Johnson et al. ..................... | 364/200 |
| 4,539,655 | * 9/1985 | Trussell et al. ...................... | 364/900 |
| 4,639,852 | * 1/1987 | Motomiya ............................ | 364/138 |
| 4,688,167 | * 8/1987 | Agarwal ............................... | 364/200 |
| 4,845,644 | 7/1989 | Anthias et al. ....................... | 364/521 |
| 4,866,638 | 9/1989 | Cosentino et al. ................... | 364/521 |
| 5,040,131 | 8/1991 | Torres .................................. | 364/521 |
| 5,041,992 | 8/1991 | Cunningham et al. .............. | 364/518 |
| 5,060,140 | 10/1991 | Brown et al. ........................ | 364/200 |
| 5,201,049 | * 4/1993 | Shorter ................................. | 395/650 |
| 5,388,268 | * 2/1995 | Berch et al. ......................... | 395/700 |
| 5,428,782 | * 6/1995 | White .................................. | 395/650 |

OTHER PUBLICATIONS

IBM TDB, vol. 31, No. 5, Oct. 1988, pp. 7–12, "Multisystem Processing Control Unit".

* cited by examiner

Primary Examiner—Tariq R. Hafiz
Assistant Examiner—Tuan Q. Pam
(74) Attorney, Agent, or Firm—William A. Kinnaman, Jr.; Bernard M. Goldman

(57) ABSTRACT

A method and system for providing a user interface in a data processing system to be utilized for performing a plurality of tasks on a plurality of diverse central processing complexes, wherein processes utilized to perform the plurality of tasks are transparent to a user, and wherein the user interface utilized to perform the plurality of tasks is common across diverse central processor complexes. A library containing interface parameters for each central processing complex is established. The interface parameters include information necessary to tailor the user interface for the specific target central processing complex, as well as processes for performing selected tasks within each of the central processing complexes. The user is prompted to select a task for at least one of the diverse central processing complexes. At least one interface parameter from the library of interface parameters is selected in response to the user selecting a task for at least one of the diverse central processing complexes. The selected task is then performed, utilizing the interface parameter or parameters to execute processes for performing the selected task within a selected one of the diverse central processing complexes. As a result, the user interface allows the user to transparently execute processes utilized to perform a task on a central processing complex.

6 Claims, 18 Drawing Sheets

METHOD AND SYSTEM FOR PROVIDING A COMMON HARDWARE SYSTEM CONSOLE INTERFACE IN DATA PROCESSING SYSTEMS

BACKGROUND OF THE INVENTION

1. Technical Field

The present invention relates in general to improved data processing systems and in particular to a method and system for providing an improved interface for controlling a data processing system. Still more particularly, the present invention relates to a method and system for providing a common hardware system console interface for controlling a number of different data processing systems.

2. Description of the Related Art

A hardware system console is a display device that is directly connected to a processor controller or service processor for a central processing complex (CPC). The hardware system console provides an end-user interface, which may be utilized to perform functions related to operational control of the CPC such as, for example, initialization, configuration, diagnosis, customization, and recovery. A CPC is defined as those portions of a system, exclusive of I/O control units and devices, that can be controlled by a single operating system. A CPC typically consists of main storage, one or more central processing units, time-of-day clocks, and channels, which are or can be placed in a single configuration. A CPC also may include channel subsystems, service processors, and expanded storage, where installed.

A user may interact with the hardware system console by means of full screen panels and/or single line commands. The hardware system console user interface is generally not consistent across various hardware types, i.e., processor families. As a result, a user working with multiple processor types installed at a site may be faced with an unnecessary level of operational complexity due to the fact that the same task on different CPCs must be accomplished utilizing a different set of user interface interactions. The result of this added complexity is a steep learning curve for the user. Consequently, either more users are needed to control multiple diverse systems or additional time and expense are required to train a user to control multiple systems.

An additional cost also is present to the manufacturer of hardware system consoles since each time a new feature or function is to be supported on multiple processor types, duplicate development effort is required to add the support of that feature or function to the user interfaces of hardware system consoles.

Therefore, it would be desirable to have a hardware system console user interface that may be utilized on different hardware types while providing the same type of user interface interactions between different hardware types.

SUMMARY OF THE INVENTION

It is therefore one object of the present invention to provide an improved data processing system.

It is another object of the present invention to provide an improved interface for controlling a data processing system.

It is yet another object of the present invention to provide a common hardware system console interface for controlling a number of different data processing systems.

The foregoing objects are achieved as is now described.

The above as well as additional objects, features, and advantages of the present invention will become apparent in the following detailed written description. The present invention permits a user interface in a data processing system to be utilized for performing a plurality of tasks on a plurality of diverse central processing complexes, wherein processes utilized to perform the plurality of tasks are transparent to a user, and wherein the user interface utilized to perform the plurality of tasks is common across diverse central processing complexes. A library containing interface parameters for each central processing complex is established. The interface parameters include information necessary to the tailoring of the user interface for each specific diverse central processing complex, as well as processes for performing selected tasks within each of the diverse central processing complexes. The user is prompted to select a task for at least one of the diverse central processing complexes. At least one interface parameter from the library of interface parameters is selected in response to the user selecting a task for at least one of the diverse central processing complexes. The selected task is then performed, utilizing the interface parameter or parameters to execute processes for performing the selected task within a selected one of the diverse central processing complexes. As a result, the user interface allows the user to transparently execute processes utilized to perform a task on a central processing complex.

The data processing system may include a video display monitor; an input device for making selections from said video display monitor; a processor; and a means of attachment to each CPC (or the service processor of the CPC) to be monitored/controlled. A first program, running on the processor, may be employed for displaying a panel on the video display monitor, which includes identification of the diverse central processing complexes and the tasks; each of the tasks may appear as a selectable category within the panel. Another program, running on the processor, may be utilized for sensing a selection by the user of one of the tasks, via the input device, generating an activation signal. A third program, running on the processor, is then utilized for performing or directing performance of the selected tasks within one of the diverse central processing complexes in response to the activation signal. The results of the performance of this task may be displayed to the user within the panel.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
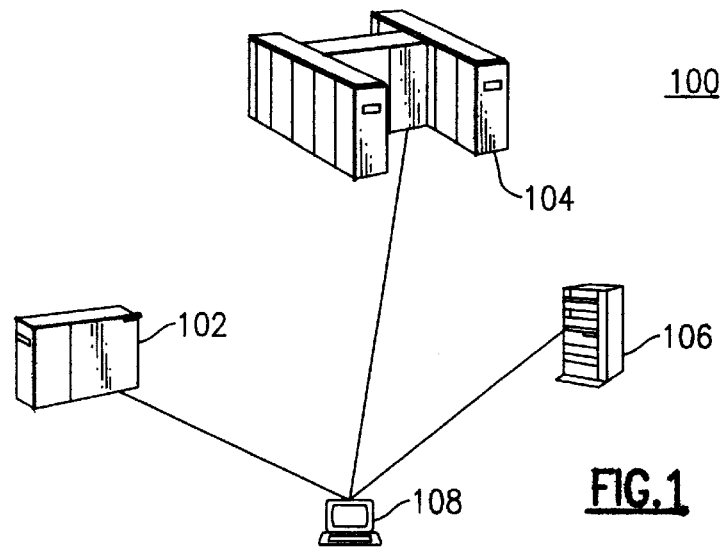
FIG. 1 depicts a pictorial representation of a data processing center environment in which a preferred embodiment of the present invention may be implemented.

Referring now to FIG. 1, a pictorial representation of a data processing center in which a preferred embodiment of the present invention may be implemented is depicted. A diverse data processing system 100 preferably includes CPC 102, CPC 104, and CPC 106, which may use different computer architectures. These CPCs (or their service processors) are connected to data processing system 108, which is utilized to perform various tasks within the CPCs. CPC 102, CPC 104, and CPC 106 may be any of various central processing complex hardware types. For example, one of the CPCs could be an IBM ES/9000 Model 900, an IBM ES/9000 Model 120, and another may be or an IBM RISC System/6000 computer. "RISC System/6000" and "ES/9000" are trademarks of International Business Machines Corporation.

Figure 2:
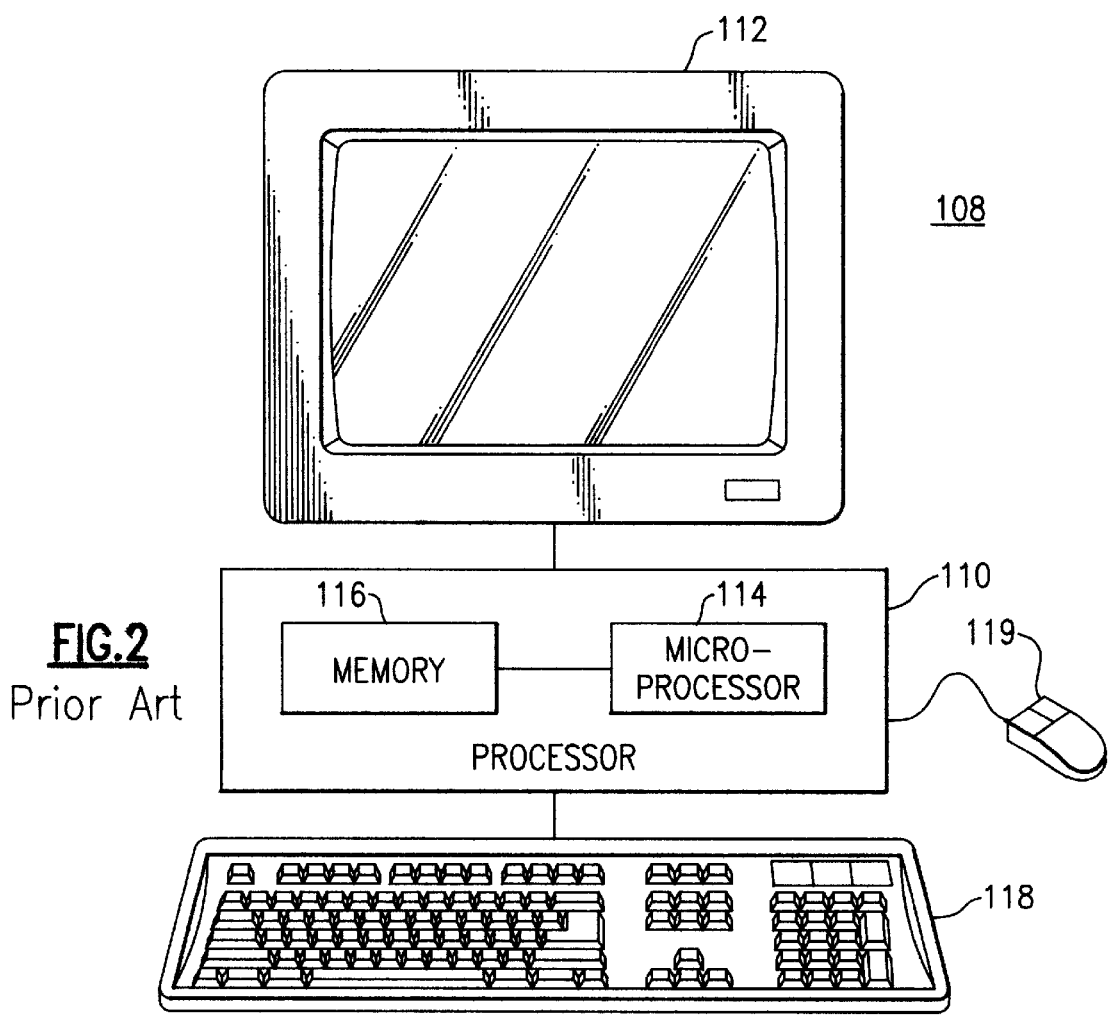
FIG. 2 is a pictorial representation of a data processing system which may be utilized to provide a user interface in accordance with a preferred embodiment of the present invention.

With reference now to FIG. 2, a pictorial representation of a data processing system in accordance with a preferred embodiment of the present invention is depicted. Data processing system 108 includes central processing unit 110 and video display device 112. Central processing unit 110 includes microprocessor 114 and memory 116. Keyboard 118 and an optional pointing device, mouse 119, also are attached to processor unit 110, providing a mechanism for user input. Video display device 112 provides the user interface that a user employs to perform various functions related to operational control of a CPC. A communications adapter (not shown) is also included.

Data processing system 108 may be implemented utilizing any of various computers such as a personal computer or an intelligent work station. For example, an IBM RISC System/6000 computer, or a PS/2 computer, products of International Business Machines Corporation, located in Armonk, N.Y., may be utilized as the data processing system processor in accordance with a preferred embodiment of the present invention. "RISC System/6000" and "PS/2" are trademarks of International Business Machines Corporation.

Figure 3A:
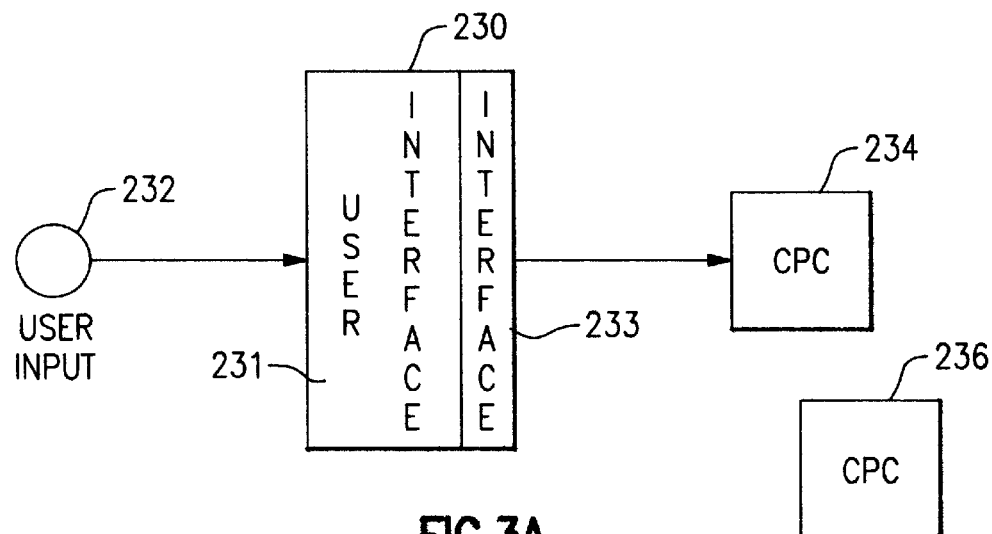
FIG. 3A depicts a block diagram of a user interface for monitoring and controlling a central processing complex, in accordance with the prior art.

Referring to FIG. 3A, a block diagram of a user interface for monitoring a central processing complex, in accordance with the prior art, is depicted. Interface system 230 receives user input 232 at user interface 231 to control CPC 234 with interface 233. Interface system 230, however, could not be utilized to control CPC 236 if CPC 236 contained a hardware type that is substantially different from the hardware type of CPC 234.

Figure 3B:
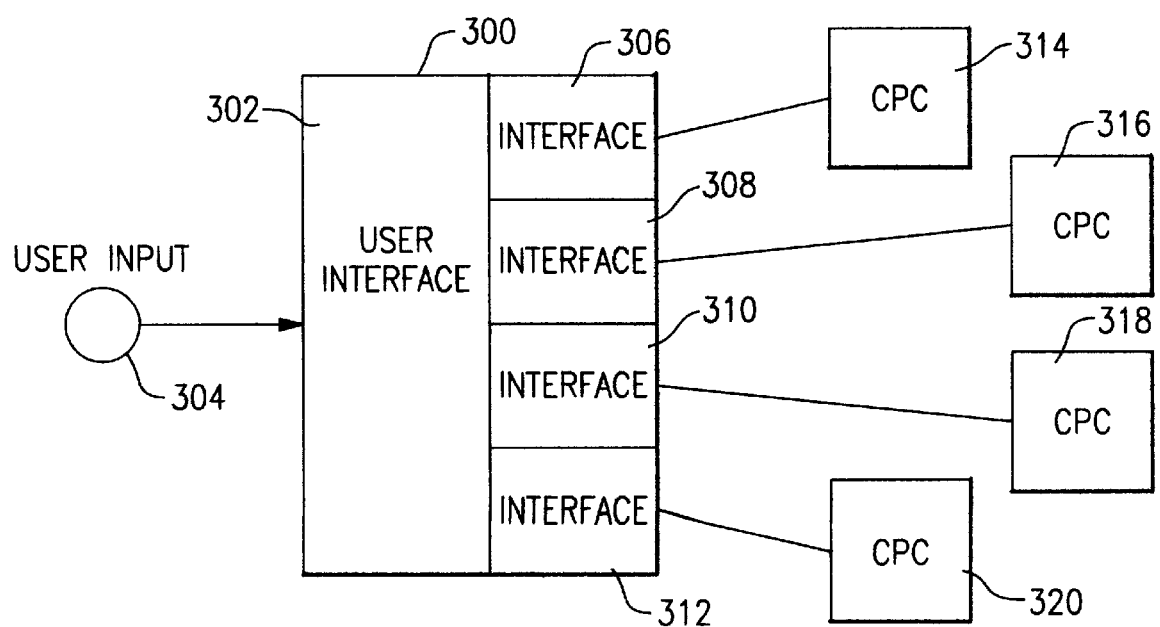
FIG. 3B is a block diagram of a user interface for monitoring and controlling a plurality of central processing complexes in accordance with a preferred embodiment of the present invention.

Referring next to FIG. 3B, a block diagram of a user interface for monitoring and controlling a plurality of central processing complexes in accordance with a preferred embodiment of the present invention is depicted. Interface system 300 includes user interface 302 for receiving user input 304. Interface unit 300 also includes interfaces 306, 308, 310, and 312. These interfaces may be utilized to control CPCs 314, 316, 318, and 320 respectively. These interfaces are constructed utilizing configuration information for specific CPC hardware types, in accordance with commands and protocols understood by the individual CPC hardware types.

In response to user input 304, user interface 302 utilizes one or more of the interfaces to perform a task on one of the CPCs. For example, if a user desires to perform a "customize" task on CPC 316, the user would select CPC 316 and the "customize" option within user interface 302. The processes necessary to perform a customization task on CPC 316 would then be executed by interface 308, in response to the user input. These processes executed to perform the task would be performed transparently to the user, without requiring the user to have any knowledge about the specific hardware type located within CPC 316, in accordance with a preferred embodiment of the present invention.

Alternatively, interface system 300 may be utilized to control a single CPC in accordance with a preferred embodiment of the present invention. In such a situation, interface system 300 may be utilized in any of a number of service processors or processor controllers utilized to control and monitor a CPC having a hardware type supported by interface system 300. In this case, multiple physical hardware console displays will exist, if there are multiple CPCs, but the user interface will be common on all consoles. A user could control or monitor various CPCs utilizing user interface 302 without requiring specific knowledge of the hardware type of a CPC.

Figure 4:
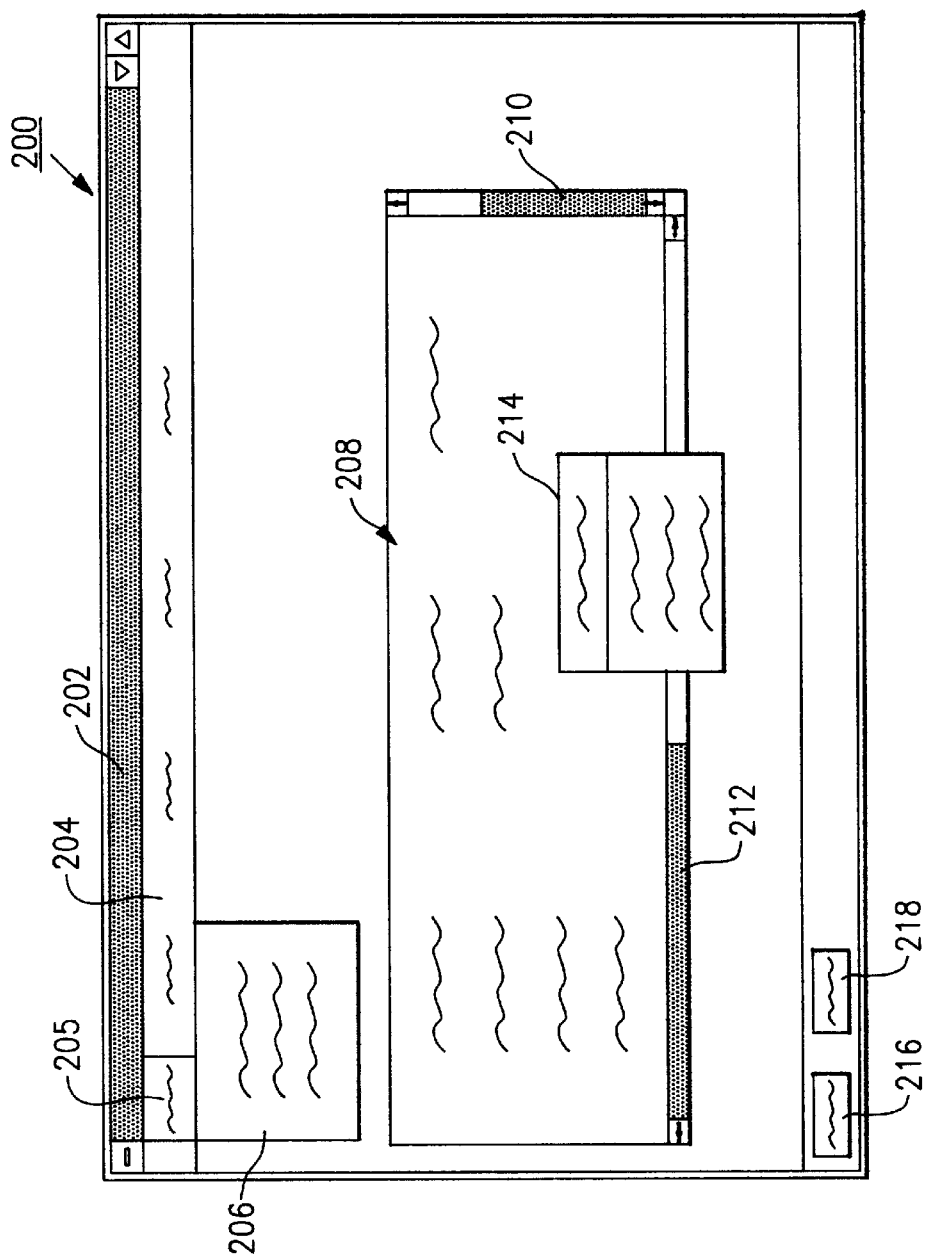
FIG. 4 is an illustration of a user interface displayed within a hardware system console, in accordance with a preferred embodiment of the present invention.

Referring now to FIG. 4, an illustration of a user interface displayed within a hardware system console is depicted. Panel 200 preferably includes title bar 202 describing the function performed or the objects listed within the panel. Action bar 204 illustrates the different categories of actions that may be performed. Pull-down menu 206 appears when a category, such as action 205, is selected from action bar 204. Such choices may be selected from the pull-down menu utilizing a pointing device, a keyboard (cursor key or program function key), or an appropriate mnemonic. Additionally, different pull-down menus may be selected by utilizing left and right cursor control keys on the keyboard. Those choices that may appear in a light gray color cannot be selected in accordance with a preferred embodiment of the present invention in a process known as "graying".

Object area 208 displays information that may instruct a user to perform various actions, such as: select an object from the menu or list, type in information, read data or information. Additionally, object area 208 also is utilized to display various types of information to the user. Normally, object area 208 displays information about a CPC that a user may perform actions on, such as, a system, channel, or processor within the CPC. Scroll bars 210 and 212 allow the display of more information than may be normally displayed on panel 200. The information may be manipulated using a keyboard or a mouse. As utilized herein, the term "mouse" refers to any type of operating system supported graphical pointing device including, but not limited to: a mouse, track ball, light pen, touch screen, and the like. A pointing device is typically employed by a user of a data processing system to interact with the data processing system's graphic user interface.

Pop-up window 214 may be displayed over the window from which a selection was made. A pop-up window 214 may contain more information needed to complete a task or may provide an instructional message. Push buttons 216 and 218 are rectangular display areas that may perform pre-defined functions when selected by the user.

Figure 5:
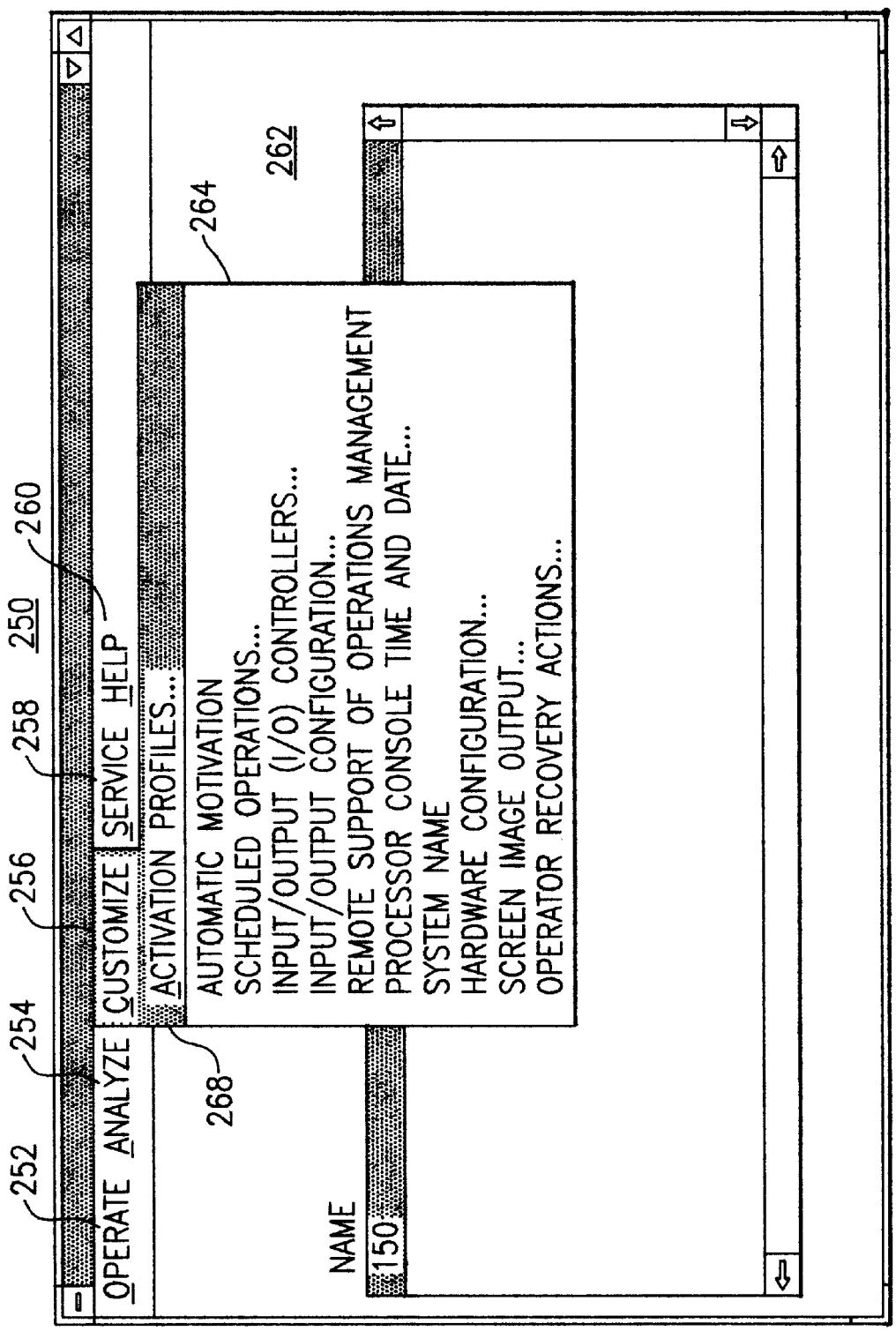
FIG. 5 is an illustration of a primary panel in a common user interface in accordance with a preferred embodiment of the present invention.

With reference to FIG. 5, an illustration of a primary panel displayed in a common user interface in accordance with a preferred embodiment of the present invention is depicted. Primary panel 250 preferably includes a number of selectable actions (i.e., tasks), including operate 252, analyze 254, customize 256, service 258, and help 260. Within object area 262, the name of the CPC selected for monitoring or control is "150". Pull-down window 264 is displayed to a user when the user selects the task, "customize" 256. Pull-down window 264 includes various subtasks such as: activation profiles; automatic activation; scheduled operations; input/output (I/O) controllers; input/output configuration; remote support or operations management; processor console time and date; system name; hardware configuration; screen image output; and operator recovery actions. A pull-down window for the operate task 252 could contain such subtasks as activate, recover, start all processors, stop all processors, deactivate, etc.

A selection of one of the subtasks may result in one or more panels being displayed to a user, to guide a user through the steps necessary to perform the subtask. In some instances, the mere selection of the subtask will cause the steps necessary to complete the subtask to be performed. In accordance with a preferred embodiment of the present invention, for each type of CPC being controlled or monitored, the panels remain substantially similar, since the panels displayed to a user are constructed in groupings defined by operational tasks and subtasks, rather than specific functions which are unique to particular CPCs.

Figure 6:
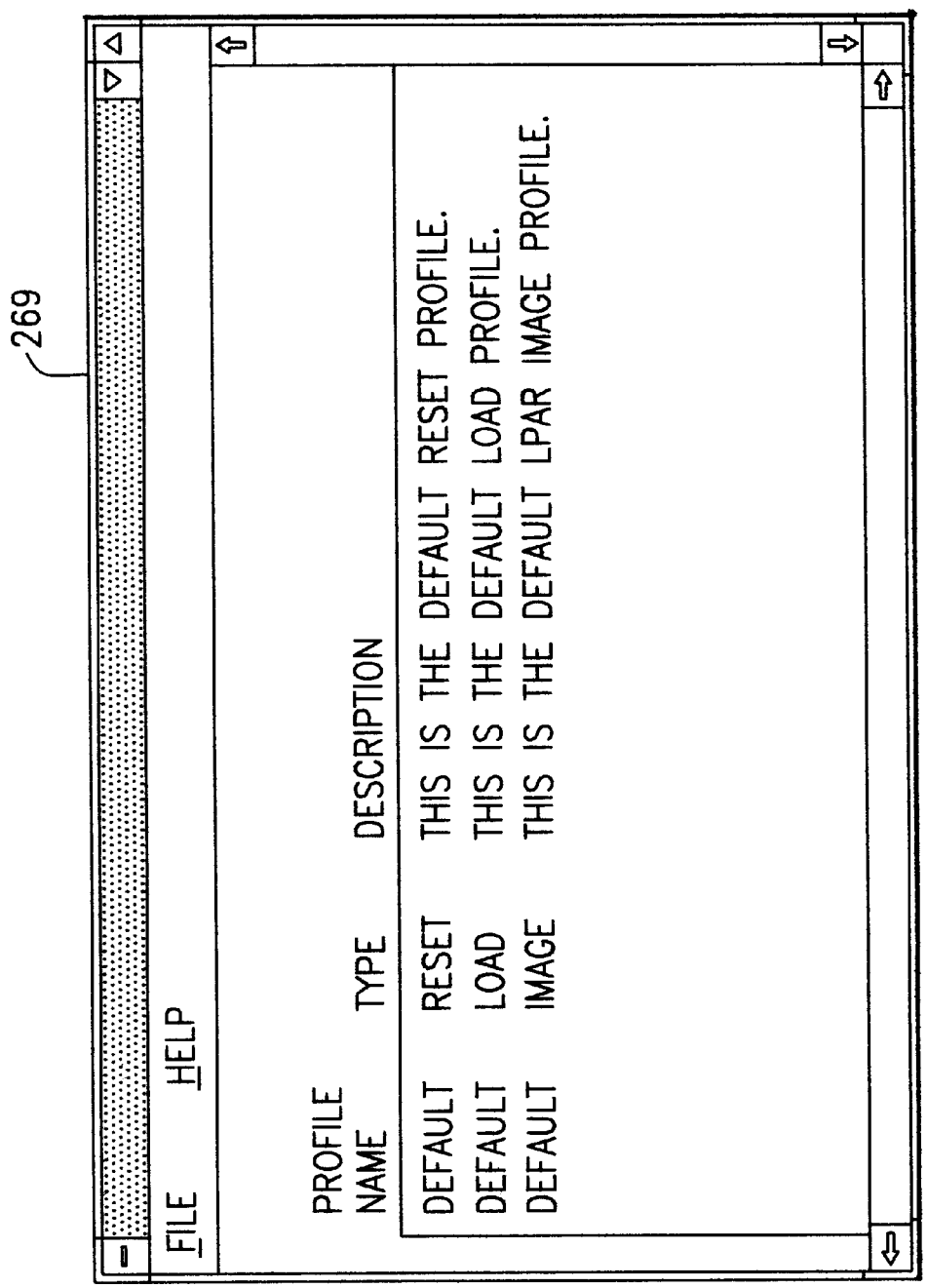
FIG. 6 illustrates a panel displaying activation profiles that may be selected by a user in accordance with a preferred embodiment of the present invention.
Figure 7:
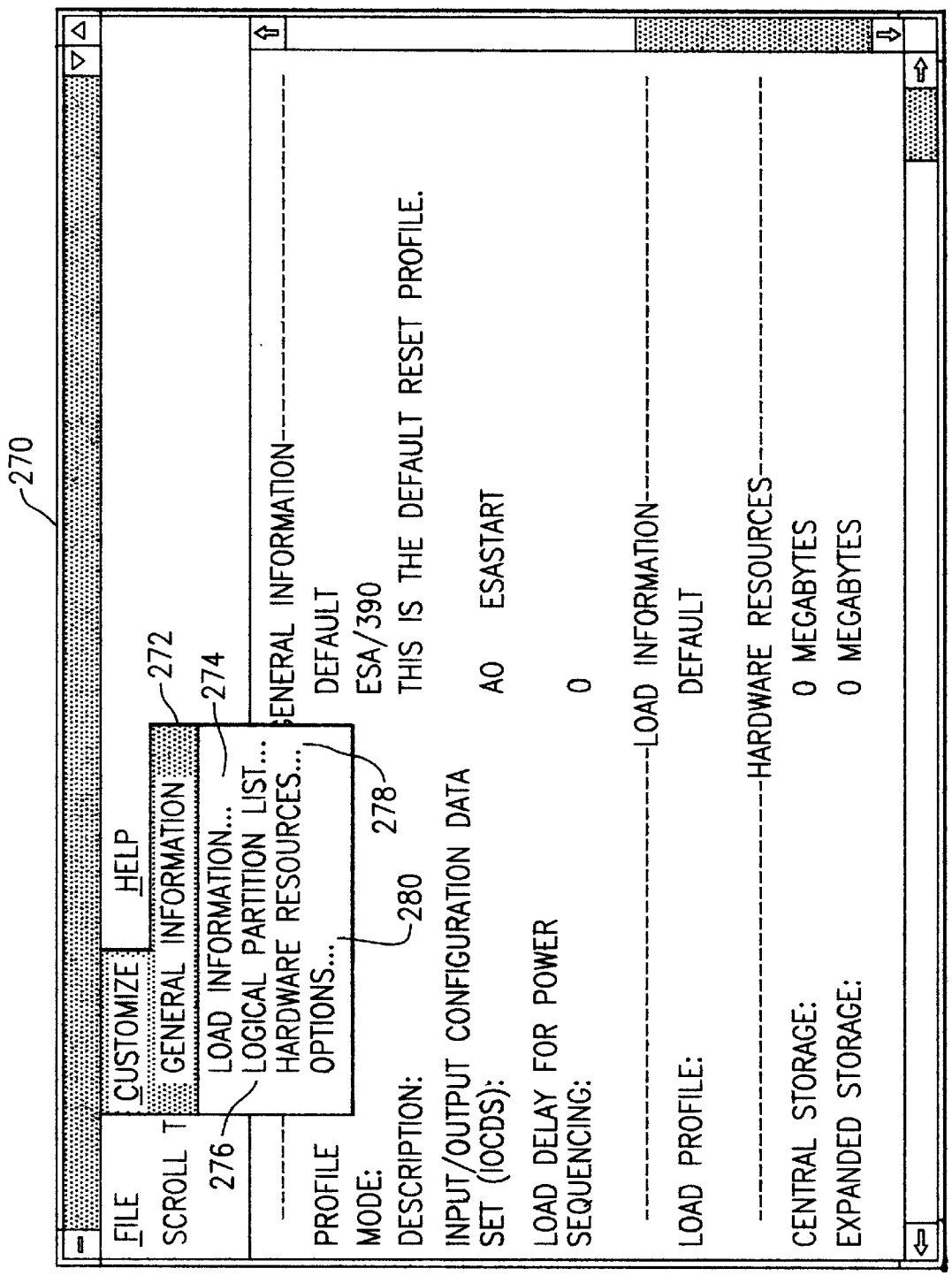
FIG. 7 is an illustration of a panel displaying a subtask to a user in accordance with a preferred embodiment of the present invention.
Figure 8:
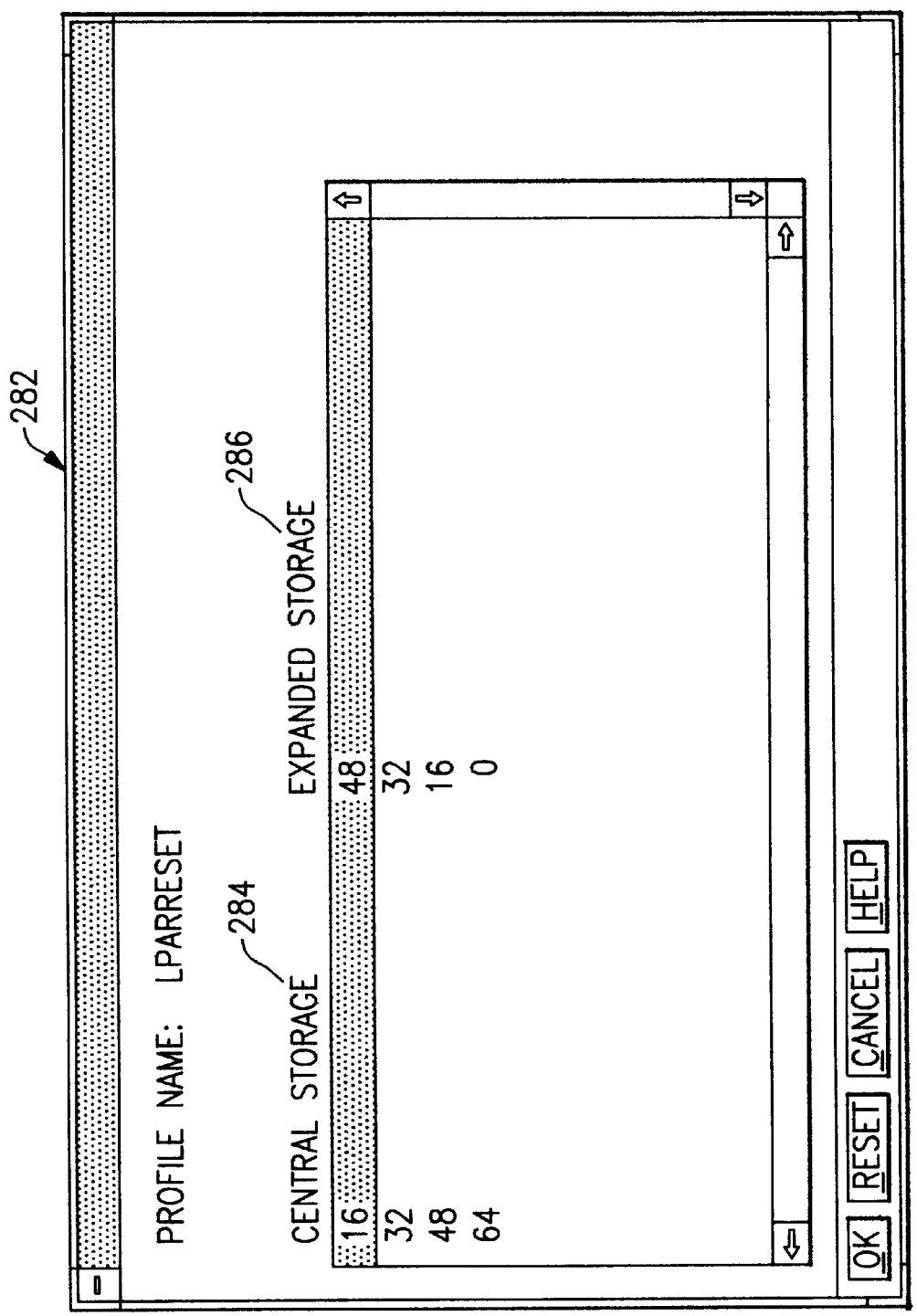
FIG. 8 is a depiction of a secondary panel for a subtask in accordance with a preferred embodiment of the present invention.

Selection of the task "customize" 256 in FIG. 5 and subtask activation profiles 268 results in the display of a panel 269 in FIG. 6 listing the available activation profiles, i.e., reset, load, image. Selection of one of these profiles and performance of the open action results in panel 270 in FIG. 7 being displayed to a user. A user would select the "customize" option within this panel and change any portions of the activation profile necessary under the customization steps listed. These steps include, for example, the customization of general information 272, load information 274, logical partition lists 276, hardware resources 278, and options 280. As illustrated, logical partition list 276 is inhibited and may not be selected by the user, in accordance with a preferred embodiment of the present invention. Selection of a step would result in another panel containing further steps being displayed to the user. For example, selection of hardware resources 278 would result in secondary panel 282 in FIG. 8 being displayed to the user. Central storage 284 and expanded storage 286 may be altered by the user in this panel. Depending on the CPC selected, various configurations may be selected by the user. If only one configuration were possible, only one selection would be displayed. The number of options displayed will depend upon the total amount and type of storage installed at the target CPC.

Figure 9:
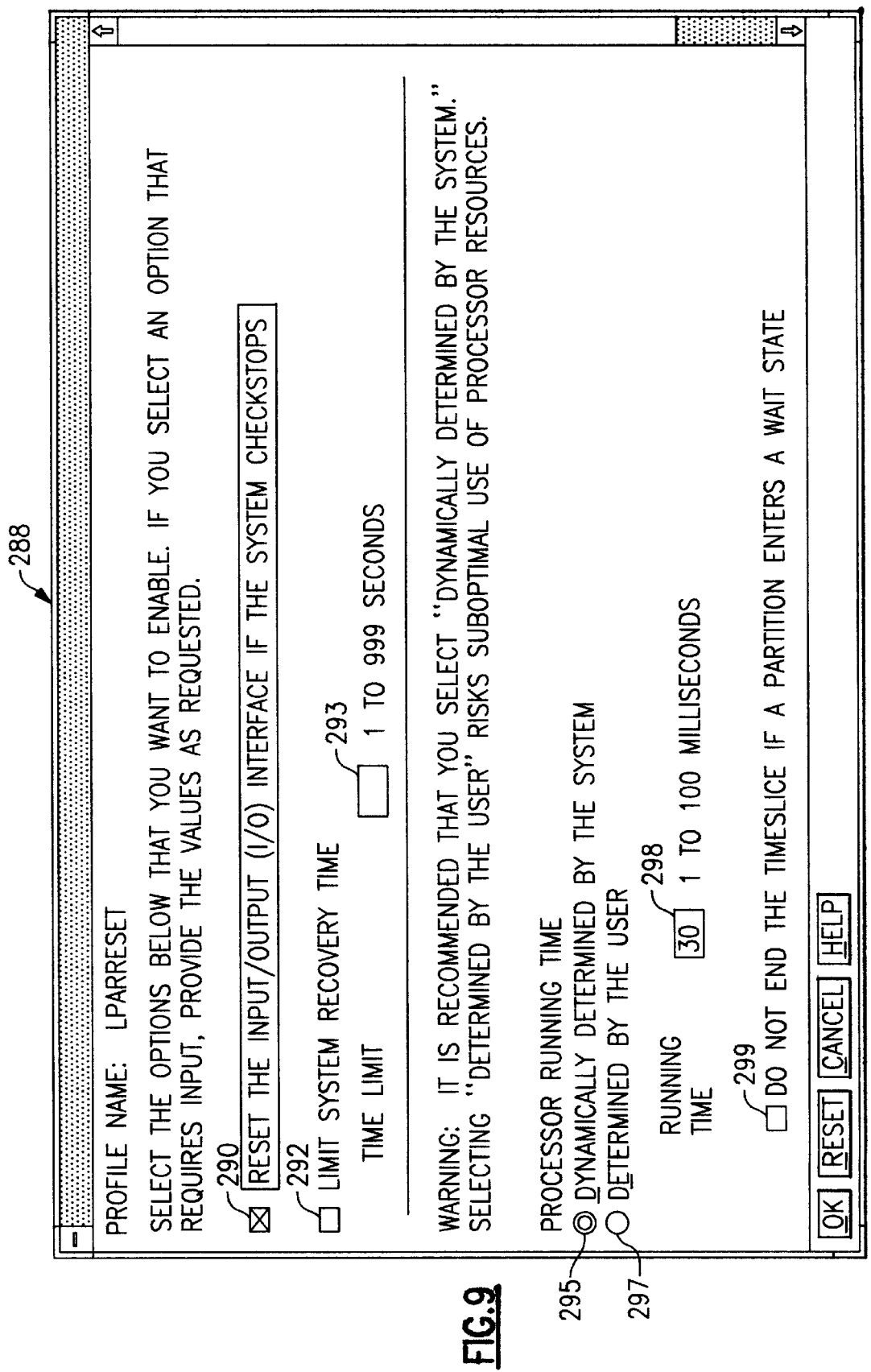
FIG. 9 illustrates a secondary panel for display in a common console interface in accordance with a preferred embodiment of the present invention.

In another example, selection of "options" 280 would result in secondary panel 288 being displayed to the user. Various options may be changed by the user, as depicted in FIG. 9. Box 290 allows the user to reset the input/output interface if the system check stops. Box 292 allows the user to limit recovery time. Selection of box 292 results in the interface prompting the user to enter a time limit between 1 to 999 seconds within box 293. The user also has the option of determining processor running time, which may be done dynamically by the system, selection 295 or by the user, selection 297. Setting processor running time by the user (selection 297) prompts the user to enter the running time in box 298. The user may also select whether or not to end a time slice if a partition enters a wait state within box 299. Depending on the CPC being controlled and monitored, various options may or may not be displayed to a user within panel 288. For example, depending on the CPC type a selection permitting expansion of the input/output configuration data set may also appear within panel 288.

Figure 10:
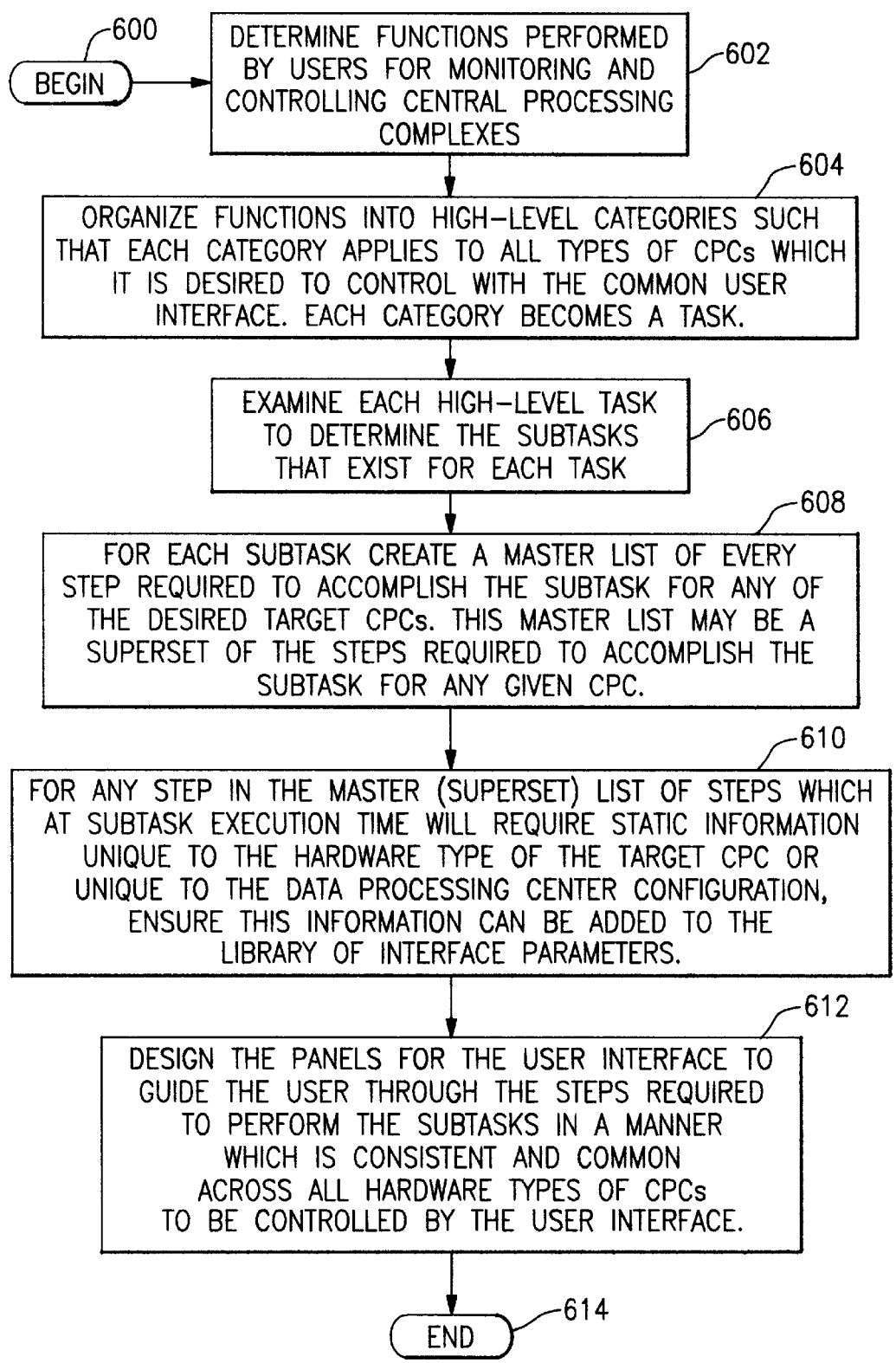
FIG. 10 is a high level flowchart illustrating a method and system for designing and creating a common hardware system console interface between different central processing complex types in accordance with a preferred embodiment of the present invention.

Referring now to FIG. 10, a high level flowchart illustrating a method and system for designing and creating a hardware system console interface system common among different CPC types in accordance with a preferred embodiment of the present invention is depicted. The process begins as illustrated in block 600 and thereafter proceeds to block 602. Block 602 depicts the determination of functions performed by users for target systems (i.e., CPCs) that are to be controlled by the common console interface in accordance with a preferred embodiment of the present invention. The various functions performed for monitoring and/or for operational control of target systems may be determined by methods well known by those skilled in the art. For example, various users of target systems may be interviewed and observed to determine the types of functions that they perform for controlling target systems.

The process thereafter proceeds to block 604, which illustrates the organization of functions into categories that apply to all of the processor types or hardware types located within the target systems to form tasks. A given category or task may contain one or more subtasks. In accordance with a preferred embodiment of the present invention, each task includes at least one subtask although it is not necessary to have a subtask for every task. Next, the process proceeds to block 606. Block 606 depicts a determination of what subtasks may exist for each task created. The process then advances to block 608, which illustrates the determination of a master list of steps needed to accomplish the subtask. The master list is created by forming a list of the steps required to perform the subtask for each of the types of CPC (target systems) to be controlled by the interface. The individual lists of steps are then combined into a single master, or superset, list. Then the process passes to block 610. Block 610 depicts the process of refining the definition of the interface parameters to be included in a library: for any step in the superset list created in block 608, if at execution time the step will require information which is unique to a particular CPC hardware type, or which is to be customized according to the wishes of the user, interface parameters for the information required by this step are defined at this time.

Afterward, the process proceeds to block 612. Block 612 illustrates the creation of panels for the user interface. The panels are designed to guide the user through the steps required to perform the subtask in a manner such that the steps are so composed and in such an order that the steps for any given target CPC (target system) are either the same as the master list of steps for the subtask or are a proper subset of the master list of steps. Panel layout should ensure that the appearance of the panels is common for all CPC hardware types; where differences are unavoidable, panel layout should ensure that the appearance of the panel is consistent for all CPC hardware types. This may be achieved by placing information related to steps which are not common on a separate panel, which is only displayed when required, or at the bottom of a panel so that the top of the panel is common and the bottom of the panel contains additional information only if appropriate. This approach is taken to make the panels look as similar as possible across diverse hardware types to create an interface that allows a user to control different target systems having different hardware types utilizing as little information specific to a particular hardware type as possible.

Figure 11:
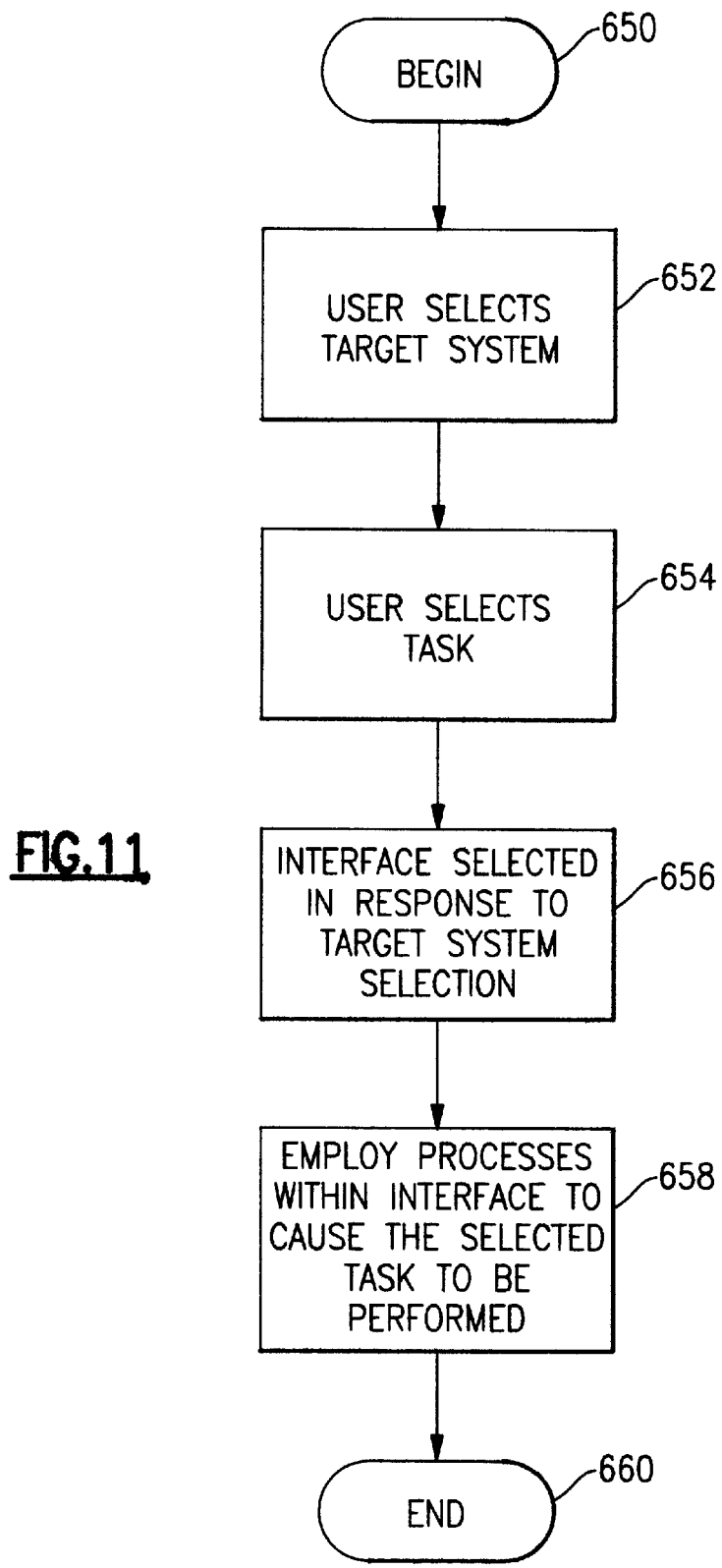
FIG. 11 is a high level flowchart of a method and system for monitoring and controlling a plurality of central processing complexes in accordance with a preferred embodiment of the present invention.
Figure 12A:
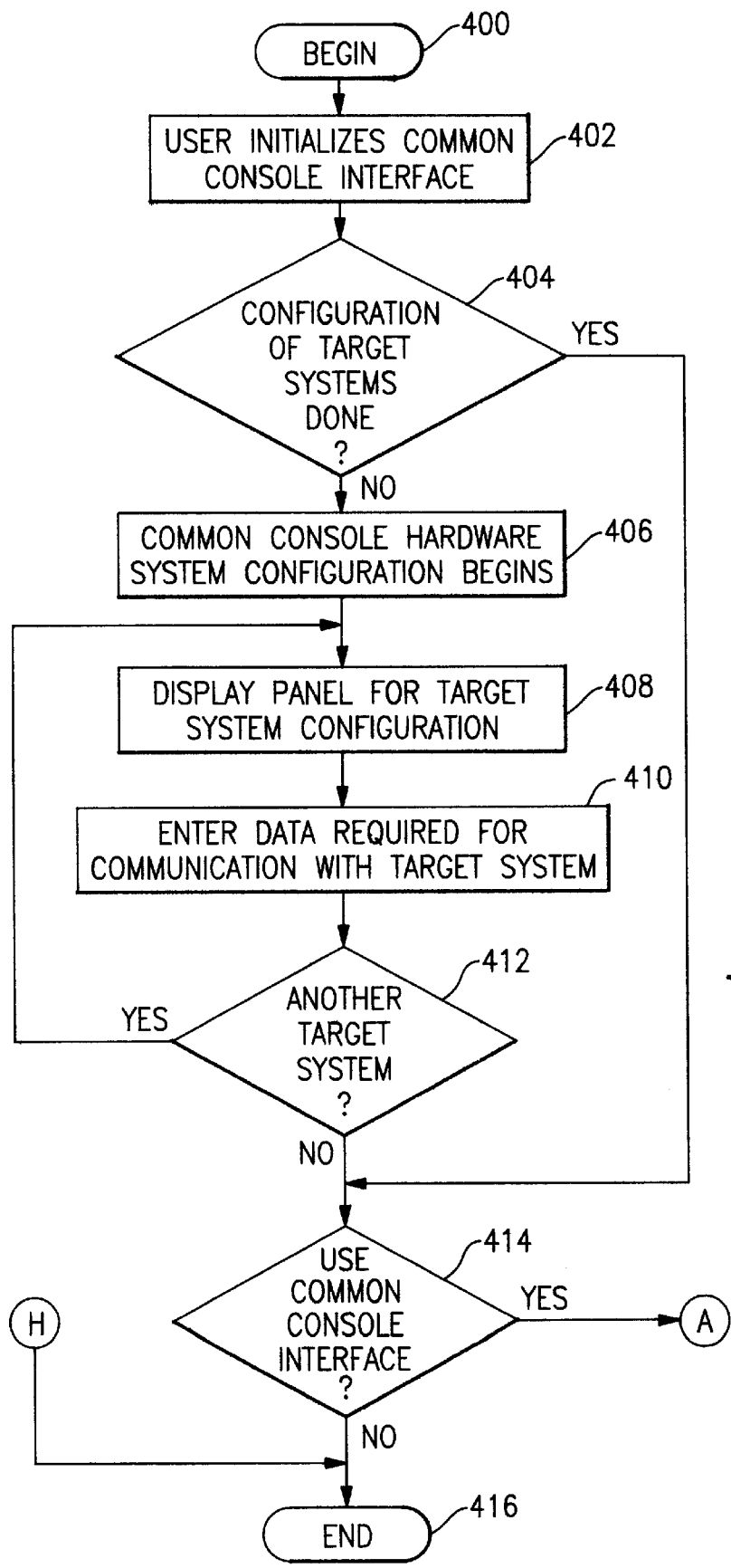
FIGS. 12A–12E depict a high level flowchart illustrating a method and system for providing a common hardware system console interface between different central processing complex types in accordance with a preferred embodiment of the present invention.
Figure 12B:
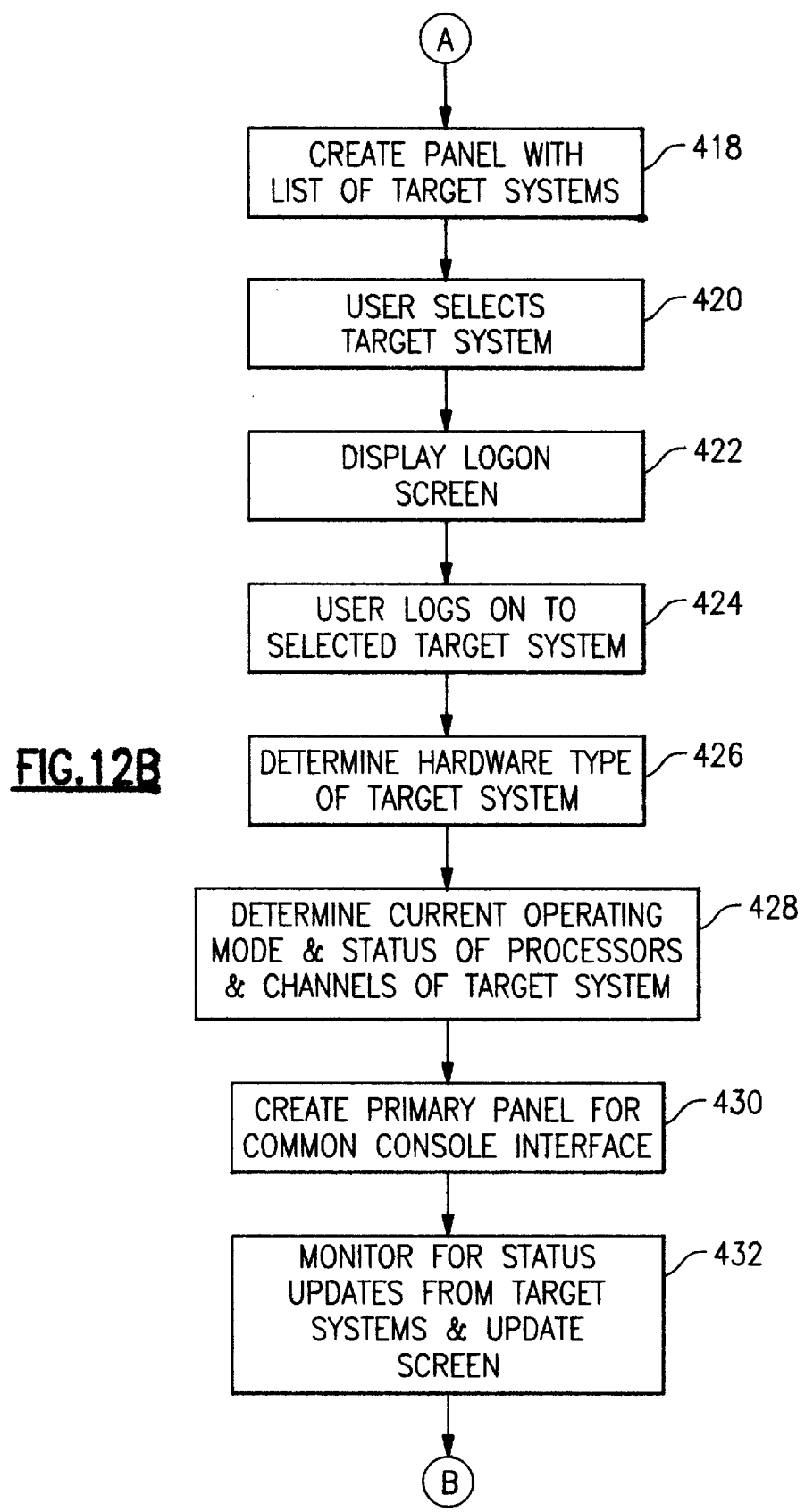
Figure 12C:
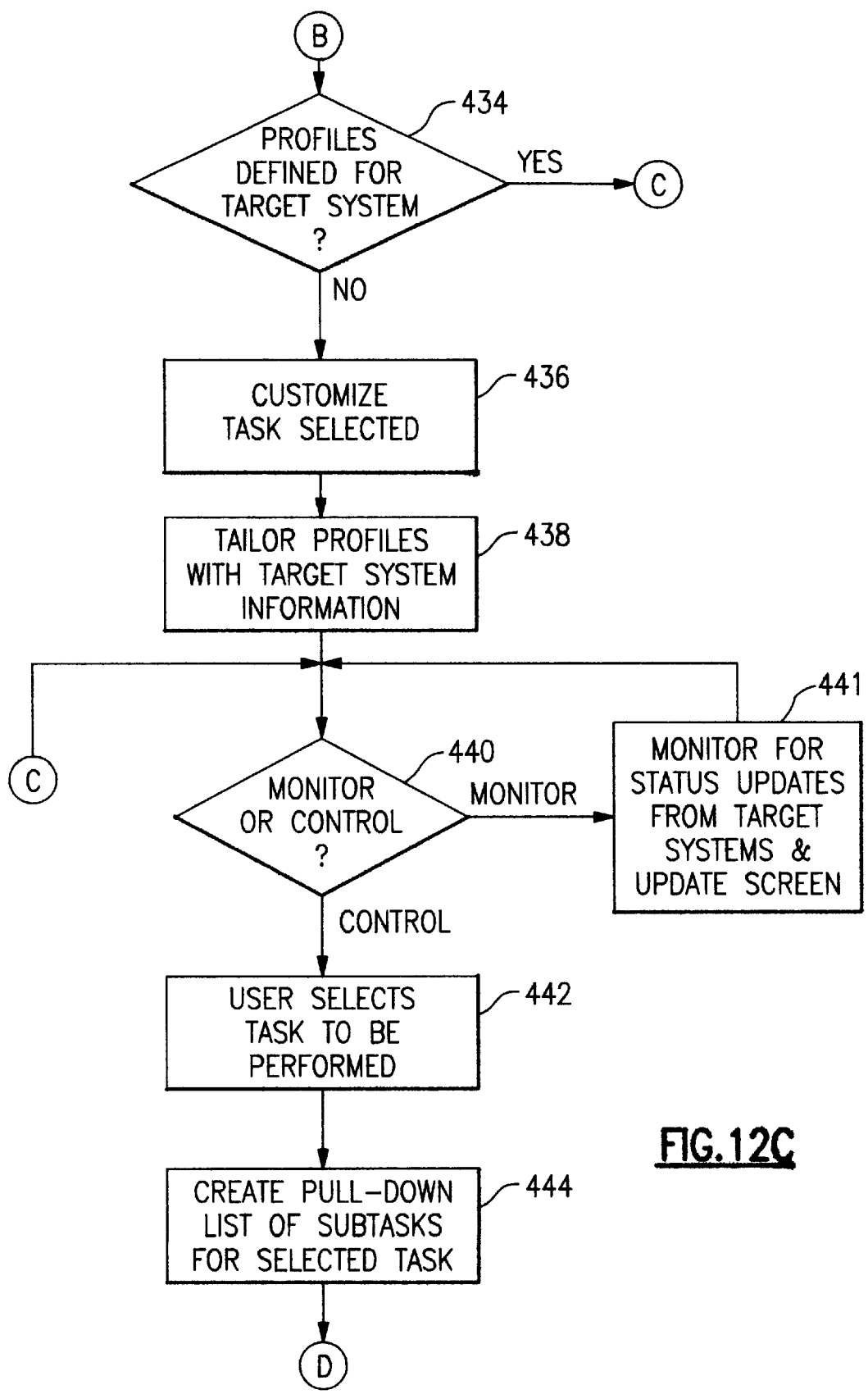
Figure 12D:
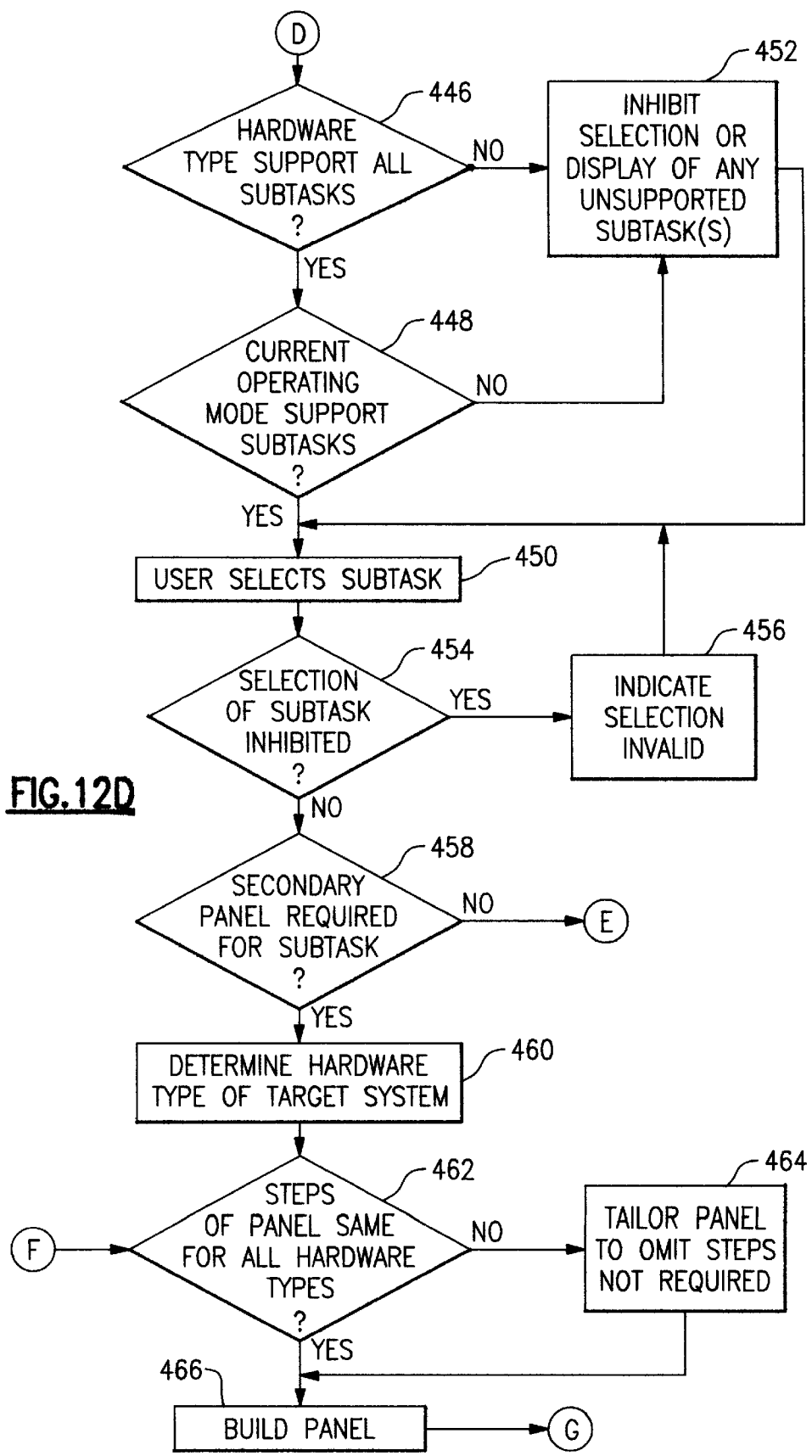
Figure 12E:
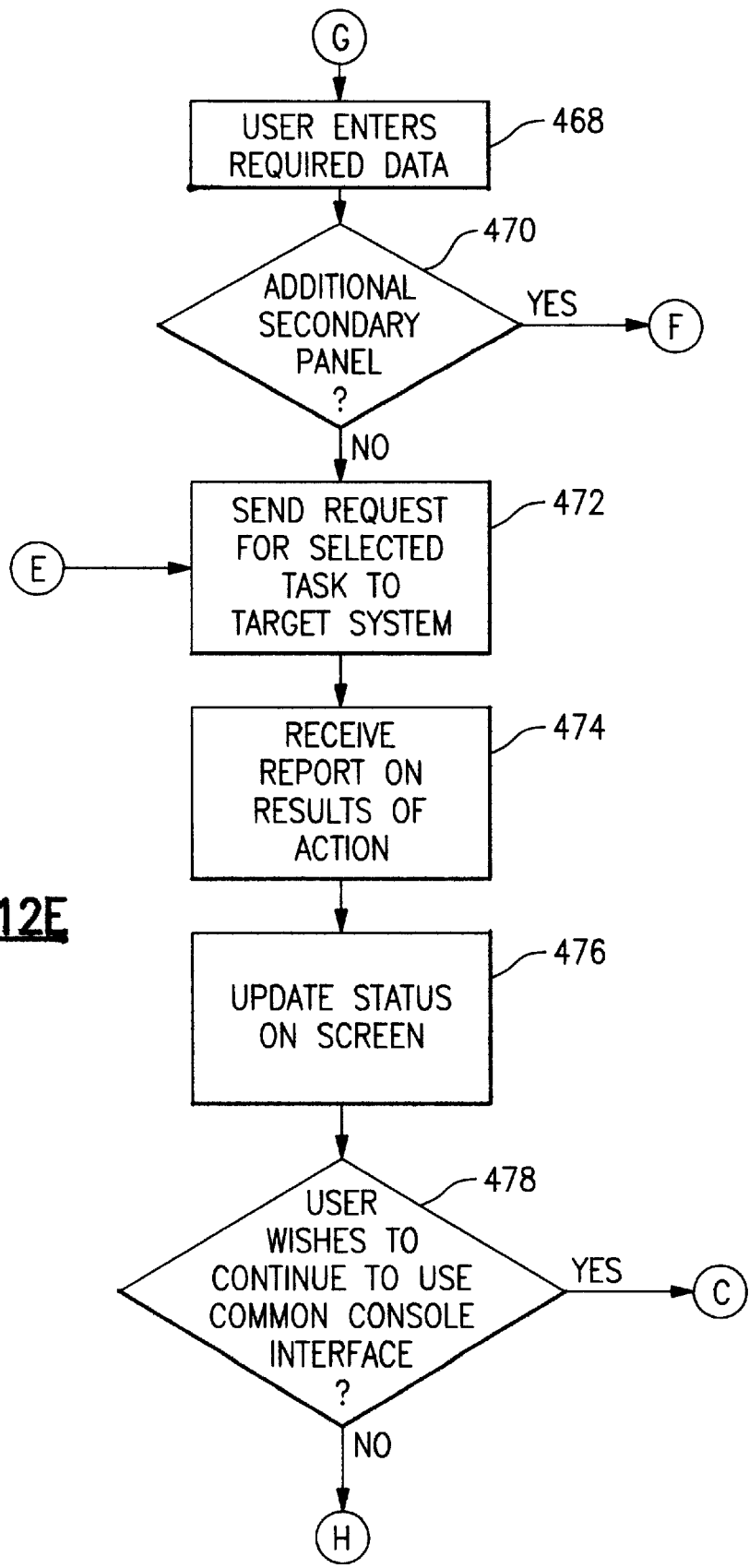

With reference now to FIG. 11, a high level flowchart of a method and system for monitoring and controlling a plurality of central processing complexes in accordance with a preferred embodiment of the present invention is depicted. The process begins as illustrated in block 650 and thereafter proceeds to block 652, which depicts the user selection of the target system for control or monitoring. The process then proceeds to block 654. Block 654 illustrates the selection of a task by the user. Afterward, the process proceeds to block 656, which depicts the selection of an interface in response to the selection of a target system by a user. The process then passes to block 658. Block 658 illustrates the employment of processes within the selected interface to cause the task selected by the user to be performed. Thereafter the process terminates as depicted in block 660.

Referring now to FIGS. 12A–12E, a high level flowchart illustrating a method and system for providing a common hardware system console interface among different central processing complex types in accordance with a preferred embodiment of the present invention is depicted. The process begins as illustrated in block 400 in FIG. 12A and thereafter proceeds to block 402, which depicts a user initializing the common console interface on a data processing system. The process then advances to block 404, which illustrates a determination of whether or not a configuration of the target systems has been performed. If a configuration of the target systems has not been performed, the process then proceeds to block 406. Block 406 depicts the beginning of a common console hardware system configuration task. This task performs the configuration of the target systems as illustrated in blocks 408, 410, and 412.

Next, the process advances to block 408, which illustrates displaying the panel for the target system configuration. The process then passes to block 410, which depicts the user entering information required for the data processing system to communicate with the target systems (i.e., CPCs). Such information may include, for example, nickname for target system, communication protocol information, and target hardware type. Afterward, the process passes to block 412, which illustrates a determination of whether or not more target systems need to be defined. If more target systems need to be defined, the process returns to block 408.

Otherwise, the process proceeds to block 414, which depicts a determination of whether or not the user desires to utilize the common console interface (the user interface). The process in block 404 also proceeds to block 414 if the configuration of the target systems has been completed. If the user does not wish to utilize the common console interface, the process terminates as illustrated in block 416. Referring back to block 414, if the user does wish to use the common console interface, the process then proceeds to block 418 in FIG. 12B via connector A. Block 418 illustrates the creation of a panel on the common hardware system console containing a list of target systems derived from the configuration information. Afterward, the process proceeds to block 420. Block 420 depicts the selection of a target system for monitoring or control by the user.

The process then passes to block 422, which illustrates the displaying of a logon screen. The user logs on to the selected target system as depicted in block 424. The process passes to block 426. Block 426 illustrates a determination of the hardware type of the specified target system utilizing user specified configuration information. The process then proceeds to block 428, which depicts a determination of the current operating mode and the status of the images, processors, and channels at the target system by querying the target system. Thereafter, the process advances to block 430, which illustrates the construction of the primary panel of the common console interface, also called the "system monitor panel" (See FIG. 5). The action bar on the system monitor panel contains selections for common tasks utilized in the monitoring and controlling of target systems in accordance with a preferred embodiment of the present invention.

Thereafter, the process proceeds to block 432. Block 432 illustrates asynchronously monitoring for status updates from the target system and the updating of the status on the system monitor panel being displayed on the screen in response to the reception of a status update. The process proceeds to block 434 via connector B in FIG. 12C. Block 434 illustrates a determination of whether or not profiles have been defined at the target system. If profiles have not been defined at the target system, the process then proceeds to block 436. Block 436 illustrates the selection of a customize task by the user. The process proceeds to block 438, which depicts tailoring a profile by filing in a profile definition panel with information relevant to the target system. Such relevant information includes, for example, the operating mode and hardware elements to be configured when the target CPC is initialized. The list of valid modes and valid hardware elements displayed on the panel for selection by the user may be determined by querying the target system. Hardware specific information also is displayed on the panels based upon determination of the hardware type of the target system from configuration data.

Next, the process proceeds to block 440. Block 440 depicts a determination of whether or not the user desires to monitor or control the target system. Referring back to block 434, if profiles have been defined at the target system, the process also proceeds directly to block 440. Monitoring of a target system is the default action in accordance with a preferred embodiment of the present invention. In the absence of any other selection by the user, processing passes to block 441, which illustrates asynchronously monitoring for status updates from the target system and updating the status on the screen in response to the reception of a status update. Thereafter, the process returns to block 440.

In response to a selection of any action by the user, the process then proceeds to block 442, which depicts a user selection of one of the tasks to be performed. Afterward, the process proceeds to block 444. Block 444 illustrates the construction of a pull-down list of subtasks for the selected task. The process proceeds to block 446 in FIG. 12D via connector D. Block 446 depicts a determination of whether or not the hardware type of the target system supports the subtasks. If all of the subtasks are supported by the hardware type, the process then proceeds to block 448, which illustrates a determination of whether or not the current operating mode of the target system supports all of the selected subtasks. If the current operating mode supports all of the subtasks, the process then proceeds to block 450, which depicts the selection of a subtask by a user.

Referring back to block 446, if the hardware type does not support all of the subtasks, the process proceeds to block 452. Block 452 depicts the inhibition of the selection or the suppression of the display of any unsupported subtask in accordance with a preferred embodiment of the present invention. Referring back to block 448, if the current operating mode of the target system does not support all of the subtasks, the process also proceeds to block 452. Thereafter, the process proceeds to block 450 as described above. From block 450, the process then passes to block 454. Block 454 illustrates a determination of whether or not the subtask selected has been inhibited. If the subtask selected is inhibited, the process then passes to block 456. Block 456 depicts showing the user that the selection is invalid or inoperative with the process then returning to block 450.

Referring back to block 454, if the subtask is not inhibited, the process then proceeds to block 458, which depicts a determination of whether or not a secondary panel is required to guide the user through the steps of the subtask. If a secondary panel is required, the process then passes to block 460. Block 460 illustrates the determination of the hardware type of the target system. Thereafter the process passes to block 462. Block 462 depicts a determination of whether or not the steps of the selected subtask on the secondary panel are the same for all hardware types. If the steps are not the same, the process proceeds to block 464. Block 464 illustrates the tailoring of the panel. The panel is tailored to display the required steps for accomplishing the selected subtask.

Thereafter, the process proceeds to block 466. The process also proceeds to block 466 directly from block 462 if all of the steps are the same. Block 466 depicts the building of the panel for display to the user. Thereafter, the process proceeds to block 468 in FIG. 12E via connector G. Block 468 illustrates the entry of required data by the user. Thereafter, the process proceeds to block 470, which depicts a determination of whether or not an additional secondary panel is required. A requirement for an additional secondary panel results in the process returning to block 462 in FIG. 12D via connector F. If an additional secondary panel is not required, the process then proceeds to block 472. Referring back to block 458, if a secondary panel is not required, the process also proceeds to block 472 via connector E. Block 472 illustrates the transmission of a request for an action to accomplish the selected task/subtask to the target system. Afterward, the process proceeds to block 474, which depicts the reception of a report on the results of the requested action. Afterward, the process proceeds to block 476, which illustrates the updating of the status on the screen of any elements affected by the action taken. The process proceeds to block 478, which depicts a determination of whether or not the user wishes to continue to utilize the common console interface (the user interface). If the user does not wish to continue to use the interface, the process terminates by returning to block 416, in FIG. 12A via connector H. Referring back to block 478, if the user does wish to continue to use the interface, the process returns to block 440 in FIG. 12C via connector C.

Figure 13A:
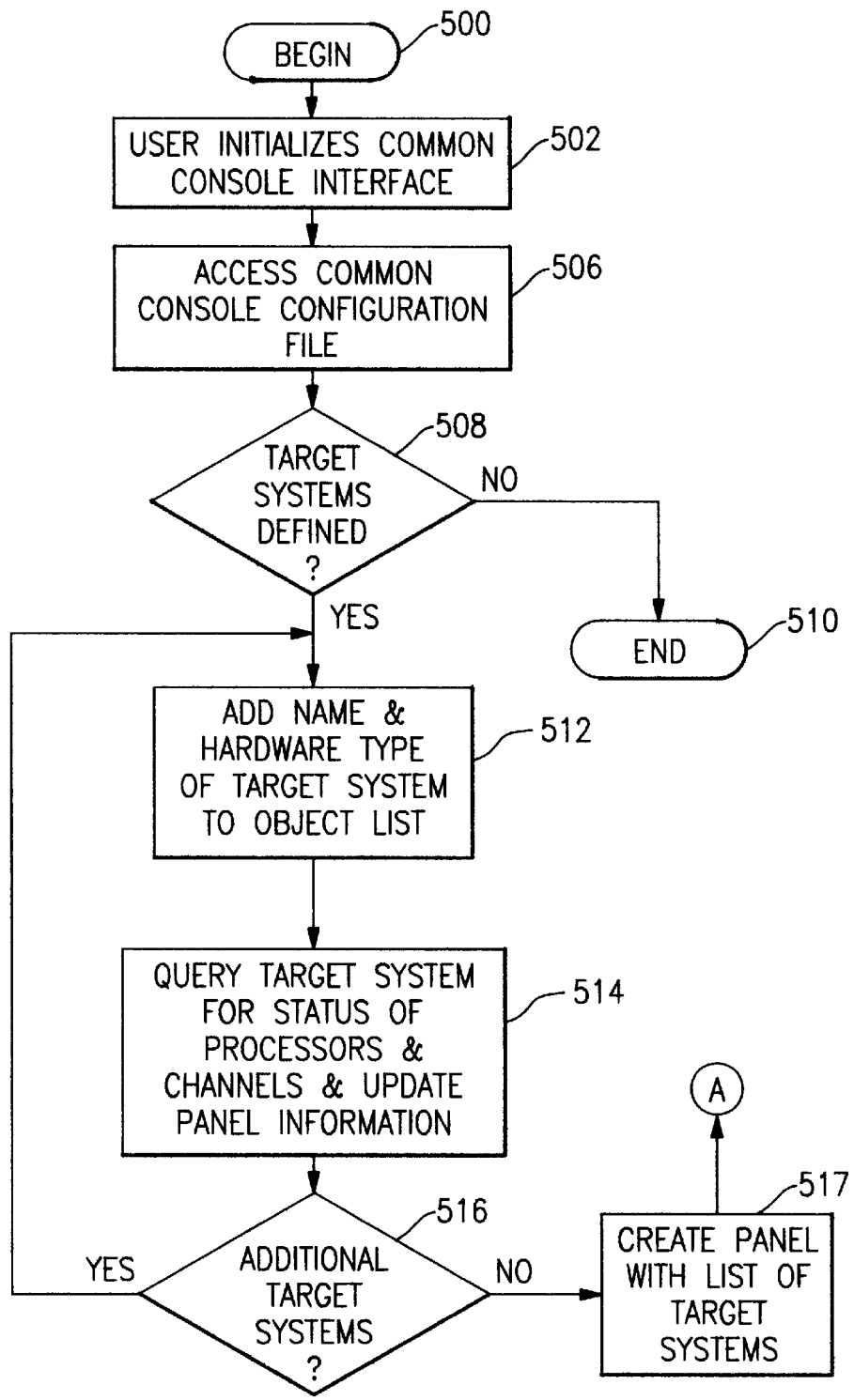
FIGS. 13A–13C illustrate a high level flowchart illustrating a method and system for tailoring a pull-down menu and a panel on a common user interface for a hardware type in accordance with a preferred embodiment of the present invention.
Figure 13B:
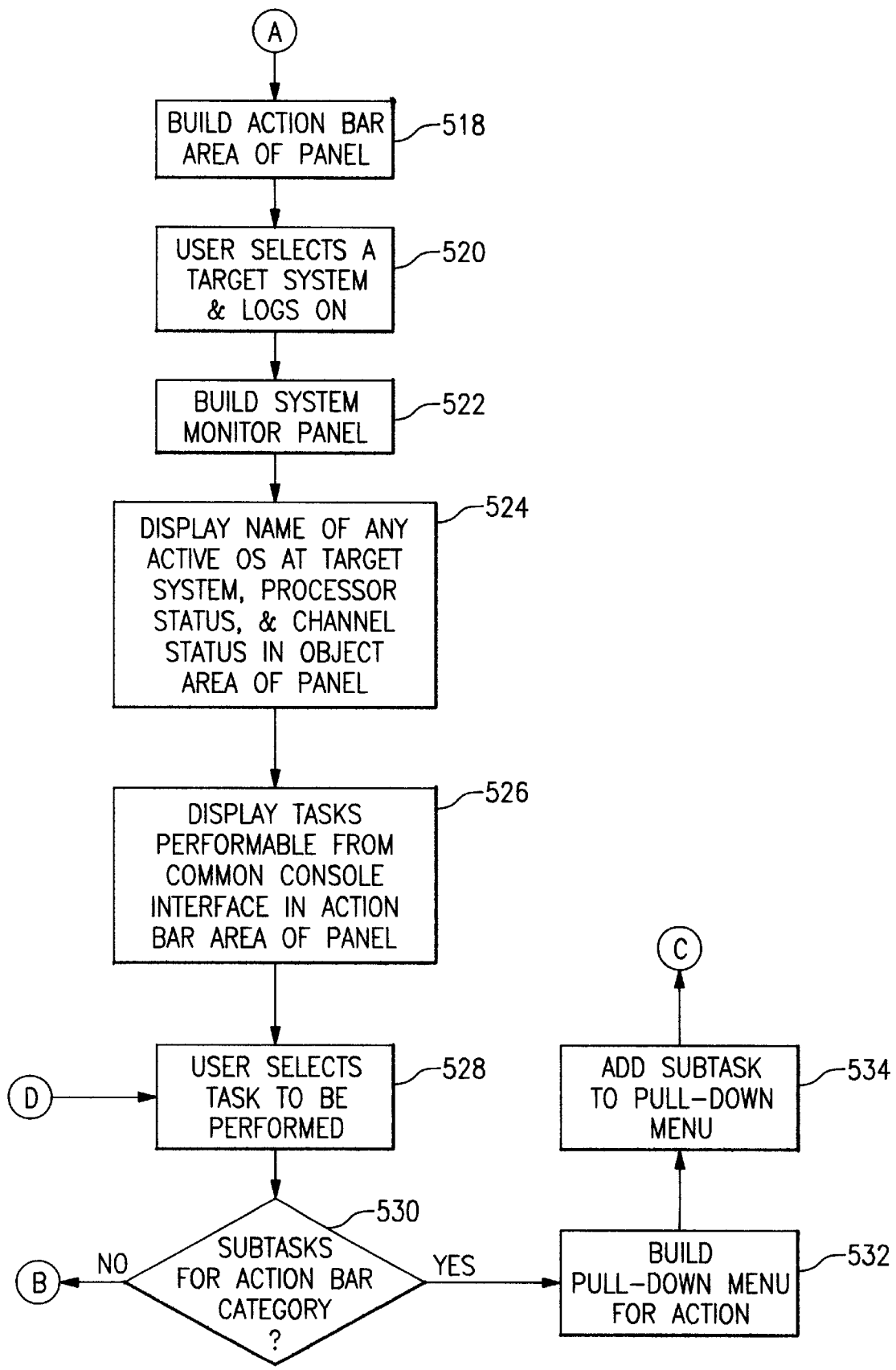
Figure 13C:
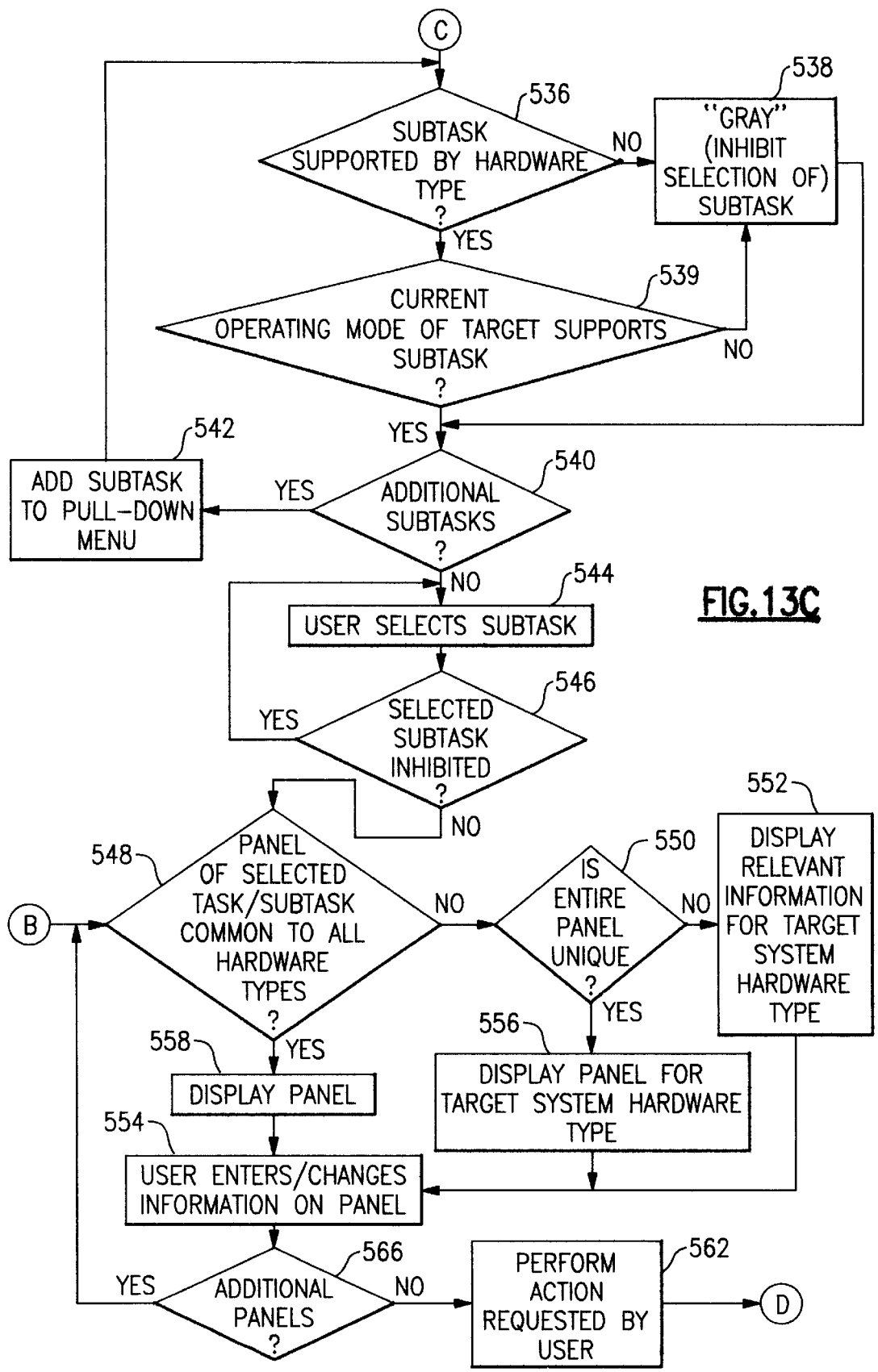

Referring now to FIGS. 13A–13C, a high level flowchart illustrating a method and system for tailoring a pull-down menu and a panel on a common user interface for a hardware type in accordance with a preferred embodiment of the present invention is depicted. The panels displayed to the user for a particular task or subtask are tailored utilizing this method and system to provide a substantially common interface for the user. In other words, the steps displayed within the panels are selected from a master or superset list of steps in order to provide an interface that is common between various hardware types on different target systems. Although some steps may be added or deleted depending on the hardware system, the interface remains substantially common between the hardware types in accordance with a preferred embodiment of the present invention. The process begins at block 500 in FIG. 13A and thereafter proceeds to block 502. Block 502 depicts the initialization of the common console interface by the user.

The process then advances to block 506, which depicts the accessing of the console configuration file. The console configuration file contains various configuration data, such as, for example, the nickname of the system, the hardware type, and communication information for networking. Afterward, the process then proceeds to block 508. Block 508 illustrates a determination of whether or not any target systems have been defined. If no target systems have been defined, the process then terminates as illustrates in block 510.

Referring back to block 508, if target systems have been defined, the process then proceeds to block 512. Block 512 depicts the addition of the name and hardware type of the target system to the system list for display in the object area of a list of systems panel (a panel displaying various data processing systems). The process then advances to block 514. Block 514 illustrates the querying of the target system to obtain the status of the target system, including information, such as, the status of processors and communications channels. This information is saved for display within the list of systems panel to reflect the target system status to the user. The process then proceeds to block 516, which depicts a determination of whether or not additional target systems have been defined. If additional target systems have been defined, the process then returns to block 512 to process the next target system.

If no additional target systems have been defined, the process then proceeds to block 517, which depicts the creation and display of the panel with the list of target systems and their statuses. The process then proceeds to block 518 in FIG. 13B via connector A. Block 518 illustrates the building of the action bar area of the panel for display to the user in accordance with a preferred embodiment of the present invention. The process then advances to block 520, which depicts the selection of a target system and the performance of a "logon" to the selected target system by the user. Afterward, the process then proceeds to block 522. Block 522 illustrates the building of the system monitor panel for the selected target system. Thereafter, the process proceeds to block 524. Block 524 depicts the placement of the name of any operating system image at the target along with the processor and channel status in the object area of the panel. Afterward, the process then proceeds to block 526, which illustrates the placement of each task that can be performed from the common hardware system console in the action bar area of the panel as a category selectable by the user. The process proceeds to block 528. Block 528 depicts the selection of a task for performance by the user.

Thereafter, the process proceeds to block 530, which illustrates a determination of whether or not any subtasks for this action bar category exists. If subtasks for the selected action bar category exist, the process proceeds to block 532. Block 532 depicts the building of the pull-down menu for the task selected as illustrated in blocks 534, 536, 538, 539, 540, and 542. The process then advances to block 534. Block 534 illustrates adding the first subtask to the pull-down menu. Next, the process proceeds to block 536 in FIG. 13C via connector C. Block 536 depicts a determination of whether or not the hardware type at the target system supports the subtask being added to the pull-down menu. If the hardware does not support the subtask, the process then proceeds to block 538. Block 538 illustrates preventing the selection of the subtask. This may be accomplished by suppressing the display of the subtask or by "graying" the subtask. "Graying" of the subtask inhibits the selection of that subtask and indicates to the user that the subtask is inhibited by changing the appearance of the subtask. Thereafter the process proceeds to block 540. Block 540 depicts a determination of whether or not any additional subtasks exist for this task.

Referring back to block 536, if the hardware does support the subtask, the process proceeds to block 539, which illustrates a determination of whether or not the current operating mode of the target system supports the subtask being added to the pull-down menu. If the current operating mode does not support the subtask, the process proceeds to block 538. If the current operating mode does support the subtask, the process proceeds to block 540. If additional subtasks exist for the task, the process then advances to block 542, which illustrates the addition of a subtask to the pull-down menu with the process thereafter returning to block 536. Referring back to block 540, if no additional subtasks exist for the task the process then proceeds to block 544. Block 544 depicts a selection of a subtask by the user.

Afterward, the process proceeds to block 546, which illustrates a determination of whether or not the selected subtask is inhibited. If the selected subtask is inhibited, the process returns to block 544. On the other hand, if the subtask is not inhibited, the process proceeds to block 548. Block 548 depicts a determination of whether or not the first/next panel of the selected task/subtask is common to all hardware types. Referring back to block 530 in FIG. 13B, if subtasks do not exist for this action bar category the process proceeds also to block 548 via connector B. If the first/next panel of the selected task/subtask is not common to all hardware types, the process then advances to block 550, which illustrates a determination of whether or not for this hardware type the entire panel is unique. If the determination is negative, the process then advances to block 552, which depicts the displaying of information relevant for the target processor hardware type.

Thereafter, the process proceeds to block 554. Block 554 illustrates the entering or changing of information on the panel by the user. Referring again to block 550, if the panel is unique for the target hardware type, the process proceeds to block 556, which depicts the displaying of the panel appropriate for the target system processor or hardware type with the process then proceeding to block 554. Referring now back to block 548, if the first/next panel of the selected task/subtask is common to all hardware types, the process proceeds to block 558, which illustrates displaying of the panel to the user. Thereafter, the process also proceeds to block 554. From block 554, the process advances to block 560. Block 560 depicts a determination of whether or not additional panels for the selected task/subtask exist. If any additional panels exist, the process returns to block 548. If no additional panels exist for the selected task/subtask, the process then proceeds to block 562, which illustrates using the information entered by the user on the panels and information in the common console configuration file to cause the action requested by the user to be performed. Thereafter the process returns to block 528 in FIG. 13B via connector D.

While the invention has been particularly shown and described with reference to a preferred embodiment, it will be understood by those skilled in the art that various changes in form and detail may be made therein without departing from the spirit and scope of the invention.

What is claimed is:

1. A method for obtaining common operational control in a data processing system by providing a common operational control interface (user interface) at an operator console utilized for controlling a plurality of control functions for a plurality of diverse central processing complexes (CPCs) at a computer installation, wherein underlying processes are utilized in the CPCs to perform said plurality of control functions for a console operator (user), each selected CPC being the same as or diverse from any other CPC in the computer installation, said method comprising the steps of:

storing a library of programmed tasks for the system console tailored to different CPCs under control of the common operational control interface at the system console, the common operational interface including:

selecting by the console operator at least one of said plurality of CPCs for performing one or more common operational control functions, displaying at the system console a plurality of function indications, a function indication being associated with a common operational control function selectable by a console operator who is viewing displayed function indications at the system console, prompting the console operator by a console control program to select one of said displayed function indications provided by the displaying step, a selected function indication having an associated common operational control function, and communicating by the control console to each selected CPC a request to perform the associated common operational control function by initiating execution by the selected CPC of an associated operational task, whereby a single operational control interface at a single console provides operational control over all CPCs at a computer installation by selecting, communicating and executing diversely programmed tasks for diverse CPCs at the computer installation.

2. The method in a data processing system for providing a user interface to be utilized for performing a plurality of common operational control functions on a plurality of diverse central processing complexes according to claim 1, the displaying step further comprising:

displaying at the system console a master list of function indications for controlling said plurality of common operational control functions; and displaying a plurality of selection panels within said user interface for displaying function indications selected from said master list of steps, the displayed selection panels being tailored for each selected CPC, wherein said each of said plurality of selection panels and master list are substantially common for each selected CPC of said plurality of diverse central processing complexes.

3. The method in a data processing system for providing a user interface to be utilized for performing a plurality of common operational control functions on a plurality of diverse central processing complexes according to claim 2, wherein said step of displaying to said user includes displaying each of said plurality of function indications as a category on an action bar of a monitor panel display of the system console.

4. The method in a data processing system for providing a user interface to be utilized for performing a plurality of common operational control functions on a plurality of diverse central processing complexes according to claim 3, further comprising displaying a status field in the monitor panel display for each selected CPC.

5. The method in a data processing system for providing a user interface to be utilized for performing a plurality of common operational control functions on a plurality of diverse central processing complexes according to claim 4, further comprising updating said status field associated with said at least one of said plurality of diverse central processing complexes in response to said step of performing said selected one of said plurality of common operational control functions within said at least one of said plurality of diverse central processing complexes.

6. The method in a data processing system for providing a user interface to be utilized for performing a plurality of common operational control functions on a plurality of diverse central processing complexes according to claim 4, wherein said step of displaying said plurality of function indications at the system console to said user includes displaying at least one sub-function indication associated with one of said plurality of function indications on a pull-down menu in response to a prior selection of a function indication.

* * * * *